US012781677B2

(12) United States Patent
Tezuka

(10) Patent No.: US 12,781,677 B2
(45) Date of Patent: Nov. 3, 2026

(54) METHOD FOR CONTROLLING HYBRID VEHICLE AND HYBRID VEHICLE

(71) Applicant: NISSAN MOTOR CO., LTD., Yokohama (JP)

(72) Inventor: Atsushi Tezuka, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 172 days.

(21) Appl. No.: 18/037,422

(22) PCT Filed: Nov. 18, 2020

(86) PCT No.: PCT/IB2020/000958
§ 371 (c)(1),
(2) Date: May 17, 2023

(87) PCT Pub. No.: WO2022/106861
PCT Pub. Date: May 27, 2022

(65) Prior Publication Data
US 2023/0407802 A1 Dec. 21, 2023

(51) Int. Cl.
*F02D 41/02* (2006.01)
*B60W 20/00* (2016.01)

(52) U.S. Cl.
CPC ......... *F02D 41/0235* (2013.01); *B60W 20/00* (2013.01); *B60W 2510/182* (2013.01); *B60W 2510/244* (2013.01); *B60W 2555/20* (2020.02); *F02D 2200/0802* (2013.01); *F02D 2200/50* (2013.01); *F02D 2200/702* (2013.01)

(58) Field of Classification Search
None
See application file for complete search history.

(56) References Cited

U.S. PATENT DOCUMENTS

| | | | | |
|---|---|---|---|---|
| 10,752,288 | B2 * | 8/2020 | Chennupalli .......... | B62D 11/10 |
| 2002/0116112 | A1 * | 8/2002 | Wakashiro ............. | B60K 6/485 903/905 |
| 2004/0060535 | A1 * | 4/2004 | Osawa .................. | B60W 10/06 123/481 |
| 2005/0168180 | A1 * | 8/2005 | Minekawa ............ | B60L 3/0046 318/268 |

(Continued)

FOREIGN PATENT DOCUMENTS

| | | |
|---|---|---|
| JP | 2013-056613 A | 3/2013 |
| JP | 2013-060132 A | 4/2013 |

(Continued)

*Primary Examiner* — Redhwan K Mawari
*Assistant Examiner* — Kai Wang
(74) *Attorney, Agent, or Firm* — Foley & Lardner LLP

(57) ABSTRACT

A hybrid vehicle includes a motor serving as a drive source, a battery configured to supply electric power to the motor, and an engine capable of supplying electric power to the battery by driving a generator. In the hybrid vehicle, the engine is operated when a magnitude of background noise exceeds a noise threshold value, in a case where an operation parameter for operating the engine when a value of the operation parameter falls below a forced operating threshold value is larger than the forced operating threshold value, the operation parameter being a parameter whose value increases as an operation time of the engine increases.

13 Claims, 8 Drawing Sheets

(56) References Cited

U.S. PATENT DOCUMENTS

| | | | | |
|---|---|---|---|---|
| 2007/0203638 | A1* | 8/2007 | Tooyama | G01C 21/3694<br>340/995.13 |
| 2009/0281690 | A1* | 11/2009 | Sasaki | G11C 29/44<br>711/E12.001 |
| 2011/0047981 | A1* | 3/2011 | Roos | F01N 13/0097<br>60/300 |
| 2013/0066495 | A1* | 3/2013 | Furuta | B60W 20/13<br>903/930 |
| 2013/0338863 | A1* | 12/2013 | Shallvari | F02D 41/0235<br>903/902 |
| 2014/0210216 | A1* | 7/2014 | Konishi | B60K 6/48<br>290/38 R |
| 2014/0267076 | A1* | 9/2014 | Birnbaum | G06F 3/016<br>340/407.1 |
| 2017/0015204 | A1* | 1/2017 | Oguri | B60K 6/365 |
| 2020/0006912 | A1* | 1/2020 | Lancaster | H01S 3/0637 |
| 2020/0398819 | A1 | 12/2020 | Higuchi et al. | |

FOREIGN PATENT DOCUMENTS

| | | | | |
|---|---|---|---|---|
| JP | 2015-120485 | A | | 7/2015 |
| JP | 2015120482 | A | * | 7/2015 |
| JP | 2016-016711 | A | | 2/2016 |
| JP | 2019-135111 | A | | 8/2019 |
| WO | WO-2019/116589 | A1 | | 6/2019 |

* cited by examiner

METHOD FOR CONTROLLING HYBRID VEHICLE AND HYBRID VEHICLE

TECHNICAL FIELD

The present invention relates to a method for controlling a hybrid vehicle and a hybrid vehicle.

BACKGROUND ART

JP2013-56613A discloses an operation method for an engine in a hybrid vehicle including the engine and a motor. According to this operation method, considering road noise generated between wheels and a road surface during traveling, the engine is operated when background noise caused by road noise is relatively large, whereas the engine is not operated when the background noise is small. By performing such operation control, in a vehicle interior, it is difficult for a driver to notice an operation sound of the engine due to the background noise, and thus comfort in the vehicle interior is improved.

SUMMARY OF INVENTION

In the hybrid vehicle, in addition to the background noise, the engine is operated according to various parameters such as a remaining amount of a battery and a catalyst temperature of an exhaust system provided in the engine, and thus the engine also may be operated in a case where the background noise is relatively small. In the vehicle interior where the background noise is small, when the engine is operated, there is a risk that the comfort in the vehicle interior is impaired.

An object of the present invention is to improve comfort in a vehicle interior by providing multiple opportunities for operating an engine in a case where background noise is relatively small.

According to a method for controlling a hybrid vehicle, the hybrid vehicle includes a motor serving as a drive source, a battery configured to supply electric power to the motor, and an engine capable of supplying electric power to the battery by driving a generator. In the hybrid vehicle, the engine is operated when a magnitude of background noise exceeds a noise threshold value, in a case where an operation parameter for operating the engine when a value of the operation parameter falls below a forced operating threshold value is larger than the forced operating threshold value, the operation parameter being a parameter whose value increases as an operation time of the engine increases.

DESCRIPTION OF EMBODIMENTS

Hereinafter, embodiments of the present invention will be described with reference to the drawings and the like.

First Embodiment

Figure 1:
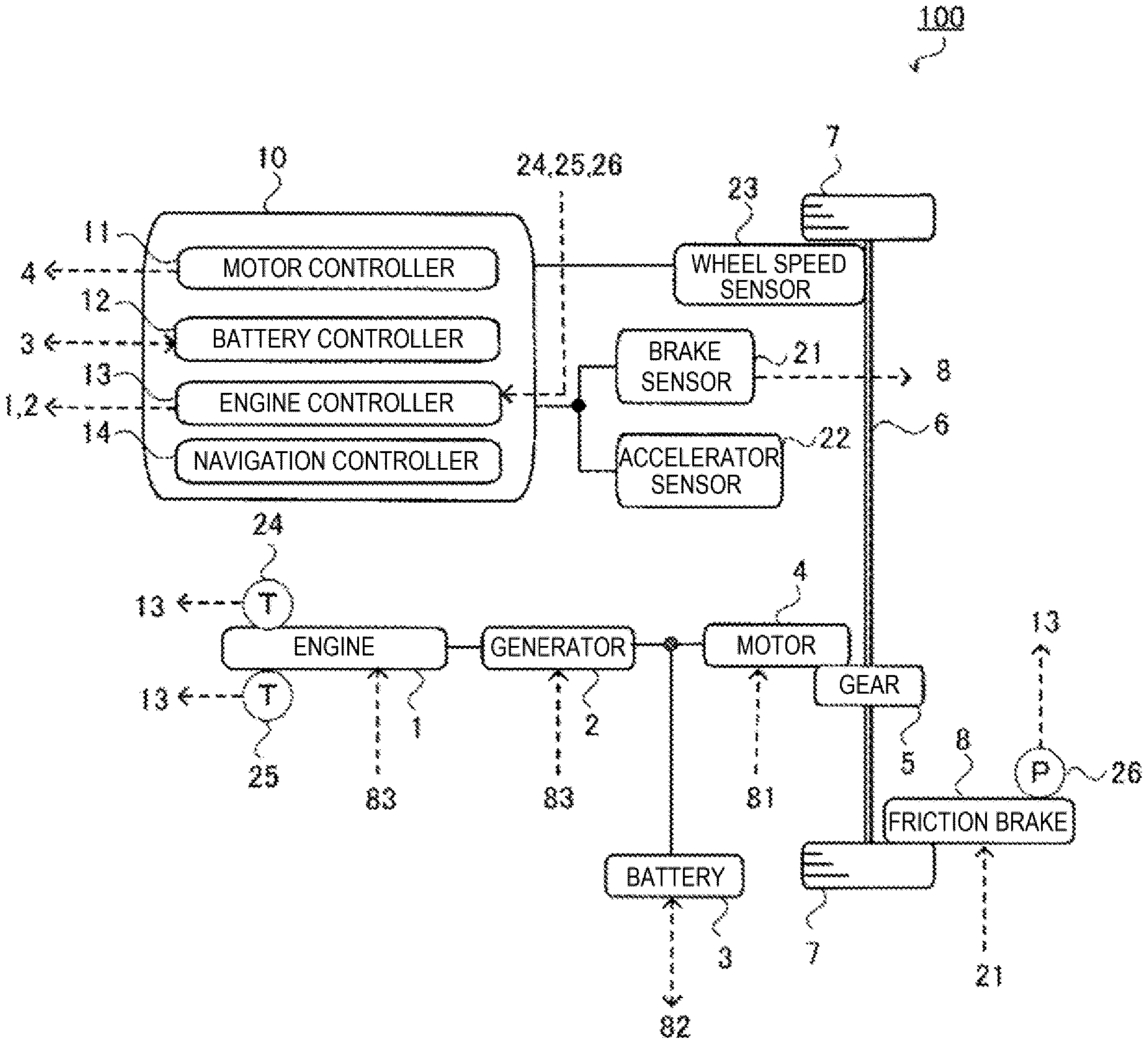
FIG. 1 is a block diagram illustrating a configuration of a hybrid vehicle according to each embodiment.

FIG. 1 is a block diagram illustrating a configuration of a hybrid vehicle according to a first embodiment of the present invention. In the present embodiment, a series type hybrid vehicle will be described, but the present invention is not limited thereto. The hybrid vehicle may be a parallel type hybrid vehicle or a hybrid vehicle in which the series type and the parallel type are used in combination. Alternatively, the hybrid vehicle may be a plug-in hybrid vehicle.

As illustrated in FIG. 1, a vehicle 100 includes an engine (internal combustion engine) 1, a generator 2, a battery 3, an electric motor 4, a gear 5, an axle 6, and wheels 7. The vehicle 100 is a series type hybrid vehicle, and the engine 1, the generator 2, and the motor 4 are connected in series. That is, power of the engine 1 is used not as a drive source of the wheels 7, but in order to generate electric power by the generator 2.

Specifically, the engine 1 is mechanically connected to the generator 2 via a reduction gear (not shown), and the generator 2 is connected to the battery 3 and the motor 4 such that electric power can be transmitted or received therebetween. According to such a configuration, a rotational driving force of the engine 1 is transmitted to the generator 2, and the generator 2 generates electric power by the driving force of the engine 1. Then, the electric power generated by the generator 2 is used to charge the battery 3 and/or to rotationally drive the motor 4. The supply of electric power to the motor 4 is performed by the generator 2 and/or the battery 3.

The motor 4 is mechanically coupled to the axle 6 via the gear 5, and the axle 6 is mechanically connect to the wheels 7. A driving force of the motor 4 is transmitted to the wheels 7 via the gear 5 and the axle 6. The wheels 7 are rotated by the driving force of the motor 4, and thus the vehicle 100 travels.

Further, a friction brake 8 is provided on the wheel 7. The friction brake 8 exerts a braking force by generating a frictional force with respect to the wheel 7. Therefore, in the vehicle 100, friction braking caused by the friction brake 8 can be performed in addition to regenerative braking caused by the motor 4.

The vehicle 100 includes a controller 10 that controls the entire vehicle. The vehicle 100 further includes a brake hydraulic pressure sensor 21 that detects a braking force, an accelerator position sensor 22 that detects an accelerator position (accelerator opening degree), a wheel speed sensor 23 that measures a rotation speed of the wheels 7, a first temperature sensor 24 that acquires a parameter related to the engine 1, a second temperature sensor 25, and a pressure sensor 26 that acquires a parameter related to the friction brake 8. The controller 10 is electrically connected to these sensors and receives detection results.

Here, the wheel speed sensor 23 is provided on a wheels 7 side below a suspension, and can measure the rotation speed of the wheels 7 in a vicinity of the wheels 7. The rotation speed of the wheels 7 detected by the wheel speed sensor 23 is used to acquire a speed of the vehicle 100, and further, as described later, the rotation speed can be used to estimate road noise generated between the wheels 7 and a road surface during traveling.

The first temperature sensor 24 provided on the engine 1 measures a temperature of a catalyst provided in an exhaust system (exhaust path) of the engine 1. The second temperature sensor 25 is provided on a water cooling system of the engine 1, and measures a temperature of cooling water that is a refrigerant. In the present embodiment, an example in which the temperature of the catalyst in the exhaust system is acquired by the first temperature sensor 24 is described, and the present invention is not limited thereto. The catalyst temperature may be estimated based on an operating point of the engine 1 and the like.

The friction brake 8 is provided with a vacuum servo to which a negative pressure is introduced, when a brake pedal is depressed, the negative pressure of the vacuum servo is used, and then relatively large friction braking can be caused even when a depressing force is small. The negative pressure of the vacuum servo is generated by the rotation of the engine 1, and is acquired by the pressure sensor 26.

In the vehicle 100, the controller 10 mainly includes a motor controller 11 that controls the motor 4, a battery controller 12 that monitors a state of the battery 3, an engine controller 13 that controls the engine 1, and a navigation controller 14 that sets a route.

In response to input from the brake hydraulic pressure sensor 21 and the accelerator position sensor 22, the motor controller 11 generates a torque command value such that the rotation speed of the wheels 7 acquired by the wheel speed sensor 23 becomes a target rotation speed, and outputs the generated torque command value to the motor 4. As a result, the motor 4 can generate a desired torque.

The battery controller 12 is able to acquire a voltage and a current in the battery 3, and monitors a state of charge (SOC) of the battery 3. Hereinafter, a ratio (charging rate) of an amount of electric power charged in the battery 3 will be simply referred to as "SOC".

The engine controller 13 operates the engine 1 and controls the SOC of the battery 3 by controlling the output of the generator 2. An operation timing of the engine 1 generated by the engine controller 13 is determined according to an operation parameter to be described later.

Here, of sounds that can be heard by a driver (including an occupant) during traveling in a vehicle interior, a sound other than an operation sound of the engine 1 is hereinafter referred to as background noise. Further, the road noise generated between the wheels 7 and the road surface while the vehicle is traveling is a main component of the background noise. When the background noise is extremely large, the operation sound of the engine 1 is difficult to be noticed by the driver in the vehicle interior. Therefore, by operating the engine 1 when the background noise is extremely large, the engine controller 13 can operate the engine 1 in a state where the operation sound is difficult to be noticed by the driver.

Further, in the present embodiment, when the operation parameter is a predetermined condition, the engine controller 13 controls the operation of the engine 1 according to the magnitude of the background noise.

As an example, the engine controller 13 acquires an angular velocity ω of the wheels 7 detected by the wheel speed sensor 23, and acquires the road noise generated between the wheels 7 and the road surface during traveling of the vehicle 100. For example, the engine controller 13 acquires an angular acceleration A of the wheels 7 by differentiating the acquired angular velocity ω of the wheels 7, obtains a variation in the acquired angular acceleration A, and estimates the magnitude of the road noise according to the variation. The engine controller 13 determines that the larger the variation of the angular acceleration A, the larger the road noise, and determines that the smaller the variation of the angular acceleration A, the smaller the road noise. In this way, the engine controller 13 obtains the road noise based on the angular velocity ω of the wheels 7 acquired by the wheel speed sensor 23, and estimates the magnitude of the background noise based on the road noise. A microphone may be provided in the vehicle interior, and the engine controller 13 may estimate the background noise based on a sound collection result obtained by the microphone.

The navigation controller 14 includes a GPS receiver, a communication interface, and a map database, which are not shown, and has a navigation function for setting a traveling route in response to an operation by the driver. The navigation controller 14 is able to acquire congestion information, and can acquire the presence or absence of congestion in the traveling route.

The controller 10 is implemented by a computer that includes a central processing unit (CPU), a read only memory (ROM), a random access memory (RAM), and an input/output interface (I/O interface). The controller 10 may be implemented as a single device, or may be divided into a plurality of blocks, and processes of the present embodiment may be distributed and performed in the plurality of blocks. A process illustrated in a flowchart to be shown later may be performed by executing a program stored in the controller 10.

Figure 2:
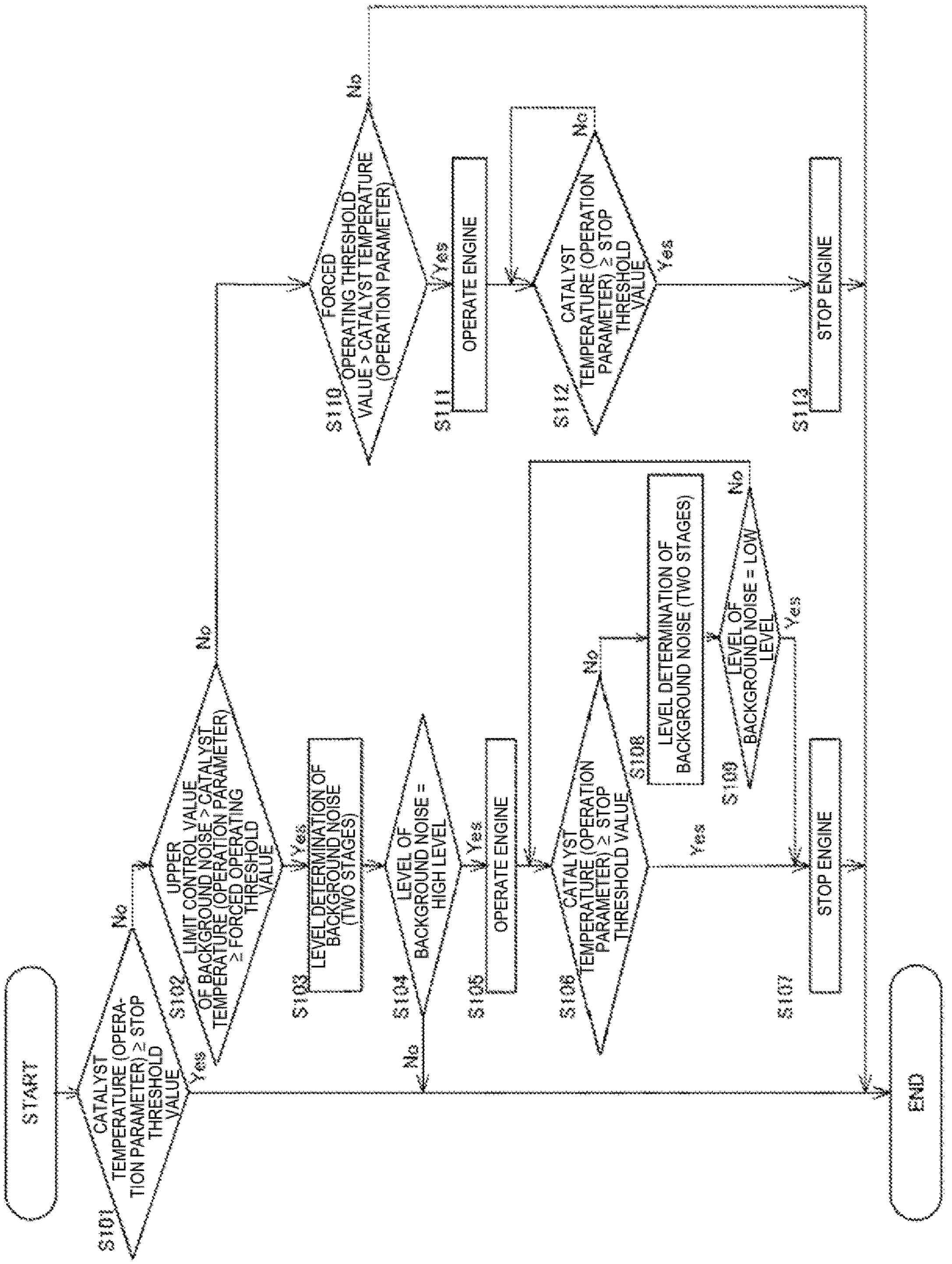
FIG. 2 is a flowchart illustrating engine operation control according to a first embodiment.

FIG. 2 is a flowchart illustrating engine operation control to be executed by the engine controller 13. The engine operation control is repeatedly executed. In addition to the engine operation control illustrated in FIG. 2, the engine controller 13 operates the engine 1 when a level of the background noise is extremely high.

In a process of FIG. 2, the operation control of the engine 1 is performed by using the operation parameter. The operation parameter has a property that the longer an operation time of the engine 1, the larger the operation parameter. Further, the operation parameter has an appropriate numerical range, and when the operation parameter falls below a forced operating threshold value of the numerical range, the operation parameter is increased by starting the operation of the engine 1. When the operation parameter exceeds a stop threshold value after the operation of the engine 1, the engine 1 is stopped.

The operation parameter is, for example, the catalyst temperature of the exhaust system in the engine 1 acquired by the first temperature sensor 24, and in the present embodiment, an example in which the operation parameter is the catalyst temperature will be described. Other examples of the operation parameter are illustrated in fifth to seventh embodiments to be described later, the operation parameter is the temperature of the cooling water in the water cooling system of the engine 1 acquired by the second temperature sensor 25 (fifth embodiment), the operation parameter is the SOC of the battery 3 (sixth embodiment), and the operation parameter is the negative pressure in the vacuum servo of the friction brake 8, which is acquired by the pressure sensor 26 (seventh embodiment).

In step S101, the engine controller 13 determines whether the catalyst temperature as the operation parameter is equal to or larger than the stop threshold value. When it is determined that the catalyst temperature is equal to or larger than the stop threshold value (S101: Yes), the engine controller 13 determines that the catalyst temperature is sufficiently high and it is not necessary to operate the engine 1, and ends the engine operation control. On the other hand, when it is determined that the catalyst temperature falls below the stop threshold value (S101: No), the engine controller 13 next performs a process of step S102 in order to further determine whether the operation of the engine 1 is necessary.

In step S102, the engine controller 13 determines whether the catalyst temperature is included in a numerical range of smaller than an upper limit control value of the background noise and equal to or larger than the forced operating threshold value. The upper limit control value of the background noise is a value that is smaller than the stop threshold value and is larger than the forced operating threshold value. The forced operating threshold value is an activation lower limit temperature, and when the catalyst temperature falls below a forced operating temperature, the operation of the engine 1 is controlled. As will be described later, even in a case where the catalyst temperature exceeds the forced operating temperature, the operation of the engine 1 is controlled when the background noise is large. The upper limit control value of the background noise indicates an upper limit of the catalyst temperature when the operation control of the engine 1 is performed according to such background noise. When it is determined that the catalyst temperature is included in the numerical range (S102: Yes), the engine controller 13 next performs a process of step S103 in order to further determine whether the operation of the engine 1 according to the background noise is necessary.

On the other hand, when it is determined that the catalyst temperature is not included in the numerical range (S102: No), the engine controller 13 determines that it is not necessary to determine whether the operation of the engine 1 according to the background noise is necessary, and next performs a process of step S110 in order to further continue the determination of the necessity of the operation of the engine 1 according to the catalyst temperature.

In step S103, the engine controller 13 obtains the background noise by using the angular velocity ω of the wheels 7 detected by the wheel speed sensor 23. As described above, for example, the engine controller 13 estimates the magnitude of the background noise caused by the road noise according to the variation of the angular acceleration A which is a differential value of the angular velocity ω. The present invention is not limited to this method, and the engine controller 13 may acquire the magnitude of the background noise by another method.

Then, the engine controller 13 uses one threshold value to determine the background noise at two levels. Specifically, the engine controller 13 determines that the background noise is at a high level when the background noise is larger than the threshold value, and determines that the background noise is at a low level when the background noise is smaller than the threshold value.

In step S104, the engine controller 13 determines whether the background noise is at the high level. When the background noise is at the high level (S104: Yes), the engine controller 13 next performs a process of step S105 in order to operate the engine 1. On the other hand, when the background noise is not at the high level (S104: No), the engine controller 13 determines that it is not a situation for operating the engine 1, and ends the engine operation control.

In step S105, the engine controller 13 operates the engine 1. By such control, even in the case where the catalyst temperature is larger than the forced operating threshold value (activation lower limit temperature), when the background noise is at the high level (S104: Yes), the engine 1 is operated (S105). As a result, in a state where the operation sound of the engine 1 is difficult to be noticed by the driver, the catalyst temperature for operating the engine 1 increases, and thus the catalyst temperature can be maintained higher than the activation lower limit temperature while maintaining the comfort in the vehicle interior.

In step S106, the engine controller 13 determines whether the catalyst temperature is equal to or larger than the stop threshold value. When it is determined that the catalyst temperature is equal to or larger than the stop threshold value (S106: Yes), the engine controller 13 determines that the catalyst temperature is sufficiently high and it is not necessary to operate the engine 1, and next performs a process of step S107 in order to stop the engine 1. On the other hand, when it is determined that the catalyst temperature falls below the stop threshold value (S106: No), the engine controller 13 next performs a process of step S108 in order to further determine whether to stop the engine 1.

In step S107, the engine controller 13 stops the engine 1. That is, when the catalyst temperature exceeds the stop threshold value by operating the engine 1 (S106: Yes), the catalyst temperature is sufficiently high, and thus the engine 1 is stopped (S107).

In step S108, as in step S103, the engine controller 13 obtains the background noise by using the angular velocity ω of the wheels 7 detected by the wheel speed sensor 23, and determines the magnitude of the background noise at the two levels.

In step S109, the engine controller 13 determines whether the background noise is at the low level. When the background noise is at the low level (S109: Yes), the engine controller 13 determines that there is a high possibility that the operation sound of the engine 1 is heard by the driver in the vehicle interior, and then performs the process of step S107 in order to stop the engine 1. On the other hand, when the background noise is not at the low level (S109: No), the engine controller 13 determines that the operation sound of the engine 1 is difficult to be heard by the driver and the operation of the engine 1 may be continued, and then returns to the process of step S106 to continue the operation of the engine 1.

As described above, in the processes of steps S103 to S109, even in the case where the catalyst temperature exceeds the forced operating threshold value (activation lower limit temperature) (S102: Yes), when the level of the background noise is high (S104: Yes), the engine controller 13 operates the engine 1 (S105). As a result, since an operation opportunity of the engine 1 in the state where the operation sound of the engine 1 is difficult to be noticed by the driver due to the background noise is increased, a state where the catalyst temperature is high can be maintained while the comfort in the vehicle interior is ensured, and thus a risk that the catalyst temperature falls below the forced operating threshold value (activation lower limit temperature) can be reduced.

On the other hand, in step S110, the engine controller 13 determines whether the catalyst temperature falls below the forced operating threshold value. When the catalyst temperature falls below the forced operating threshold value (S110: Yes), the engine controller 13 determines that the operation of the engine 1 is necessary in order to increase the catalyst temperature, and then performs a process of step S111.

In step S111, the engine controller 13 operates the engine 1.

In step S112, the same process as in step S106 is performed. That is, the engine controller 13 determines whether the catalyst temperature is equal to or larger than the stop threshold value. When it is determined that the catalyst temperature is equal to or larger than the stop threshold value (S112: Yes), the engine controller 13 next performs a process of step S113. On the other hand, when it is determined that the catalyst temperature falls below the stop threshold value (S112: No), the engine controller 13 next continues the process of step S112.

In step S113, the engine controller 13 stops the engine 1. In this way, when the catalyst temperature falls below the forced operating threshold value, the engine 1 is operated, and thus the catalyst temperature increases to the stop threshold value.

In the present embodiment, a value smaller than the stop threshold value is used as the upper limit control value of the background noise. This is because continuous repetition of the process between the process (S105) in which the catalyst temperature is lower than the upper limit control value of the background noise (S102: Yes) and the engine 1 is operated, and the process (S106) in which the catalyst temperature is equal to or larger than the stop threshold value (S101: Yes) and the engine 1 is stopped is reduced.

For example, when the upper limit control value of the background noise is the same value as the stop threshold value, the following process may be performed. When the catalyst temperature slightly falls below the stop threshold value (S101: No, S102: Yes), after the operation of the engine 1 (S105), the catalyst temperature immediately exceeds the stop threshold value (S106: Yes), and the engine 1 is stopped (S107). Such a stop of the engine 1 after the operation in a short time is not desirable. Therefore, by setting a value smaller than the stop threshold value as the upper limit control value of the background noise, the repetition of the processes of the operation and the stop of the engine 1 can be reduced.

Further, although there is a possibility that the above-described processes are repeated, the same value as the stop threshold value may be used as the upper limit control value of the background noise. Even if the same value as the stop threshold value is used as the upper limit control value of the background noise, when the catalyst temperature is between the stop threshold value and the forced operating threshold value (S102: Yes), the operation control of the engine 1 according to the level of the background noise can be performed by the processes of steps S103 to S109.

The outline of the engine operation control illustrated in FIG. 2 is shown in the following table.

TABLE 1

| | Levels of background noise | |
|---|---|---|
| | High | Low |
| Catalyst temperature (operation parameter) ≥ stop threshold value | Engine 1 is not operated | Engine 1 is not operated |
| Stop threshold value > catalyst temperature (operation parameter) ≥ upper limit control value of background noise | Engine 1 is not operated | Engine 1 is not operated |
| Upper limit control value of background noise > catalyst temperature (operation parameter) ≥ forced operating threshold value | Engine 1 is operated | Engine 1 is not operated |

TABLE 1-continued

| | Levels of background noise | |
|---|---|---|
| | High | Low |
| Forced operating threshold value > catalyst temperature (operation parameter) | Engine 1 is operated | Engine 1 is operated |

In this table, the high level and the low level of the background noise are shown in a column direction, and three conditions corresponding to the catalyst temperature are shown in a row direction. In the row direction, the case where the catalyst temperature is equal to or larger than the stop threshold value (S101: Yes) is shown in a first row, the case where the catalyst temperature is smaller than the stop threshold value and is equal to or larger than the upper limit control value of the background noise is shown in a second row, the case where the catalyst temperature is smaller than the upper limit control value of the catalyst temperature and is equal to or larger than the forced operating threshold value (S101: No, S102: Yes) is shown in a third row, and the case where the catalyst temperature is smaller than the forced operating threshold value (S101: No, S102: No, S110: Yes) is illustrated in the fourth row.

In the case where the catalyst temperature exceeds the stop threshold value, which is shown in the first row, the engine 1 is not operated, and thus the operation control of the engine 1 according to the level of the background noise does not occur. Similarly, the case where the catalyst temperature falls below the stop threshold value and is equal to or larger than the upper limit control value of the background noise is shown in the second row. When the catalyst temperature is within such a numerical range, according to FIG. 2, the engine 1 is not operated after the three determination processes (S101: No, S102: No, S110: No), and thus the same process as that of the case where the catalyst temperature is equal to or larger than the stop threshold value (S101: Yes), which is shown in the first row, is performed.

Further, in the case where the catalyst temperature falls below the forced operating threshold value (activation lower limit temperature), which is illustrated in a fourth row, the engine 1 is operated irrespective of the noise level, and thus the operation control of the engine 1 according to the level of the background noise does not occur.

On the other hand, referring to the third row, in the case where the catalyst temperature is smaller than the upper limit control value of the background noise and is equal to or larger than the forced operating threshold value (S101: No, S102: Yes), an operation method for the engine 1 differs according to the level of the background noise. That is, when the background noise is at the high level (S104: Yes), the engine 1 is operated (S105). On the other hand, when the background noise is at the low level (S104: No), the engine 1 is not operated.

In this way, even in the case where the catalyst temperature is larger than the forced operating threshold value (activation lower limit temperature), the engine 1 is operated when the background noise is at the high level, and thus in a state where the operation sound of the engine 1 is relatively difficult to be noticed by the driver, the catalyst temperature can be increased by the operation of the engine 1. Therefore, it is possible to maintain a state where the catalyst temperature is higher than the activation lower limit temperature. On the other hand, when the background noise is at the low level, the operation sound of the engine 1 is easily noticed by the driver, and thus the operation of the engine 1 is restricted, whereby it is possible to improve the comfort in the vehicle interior.

Effects obtained by the present embodiment will be described with reference to FIGS. 3 and 4.

Figure 3:
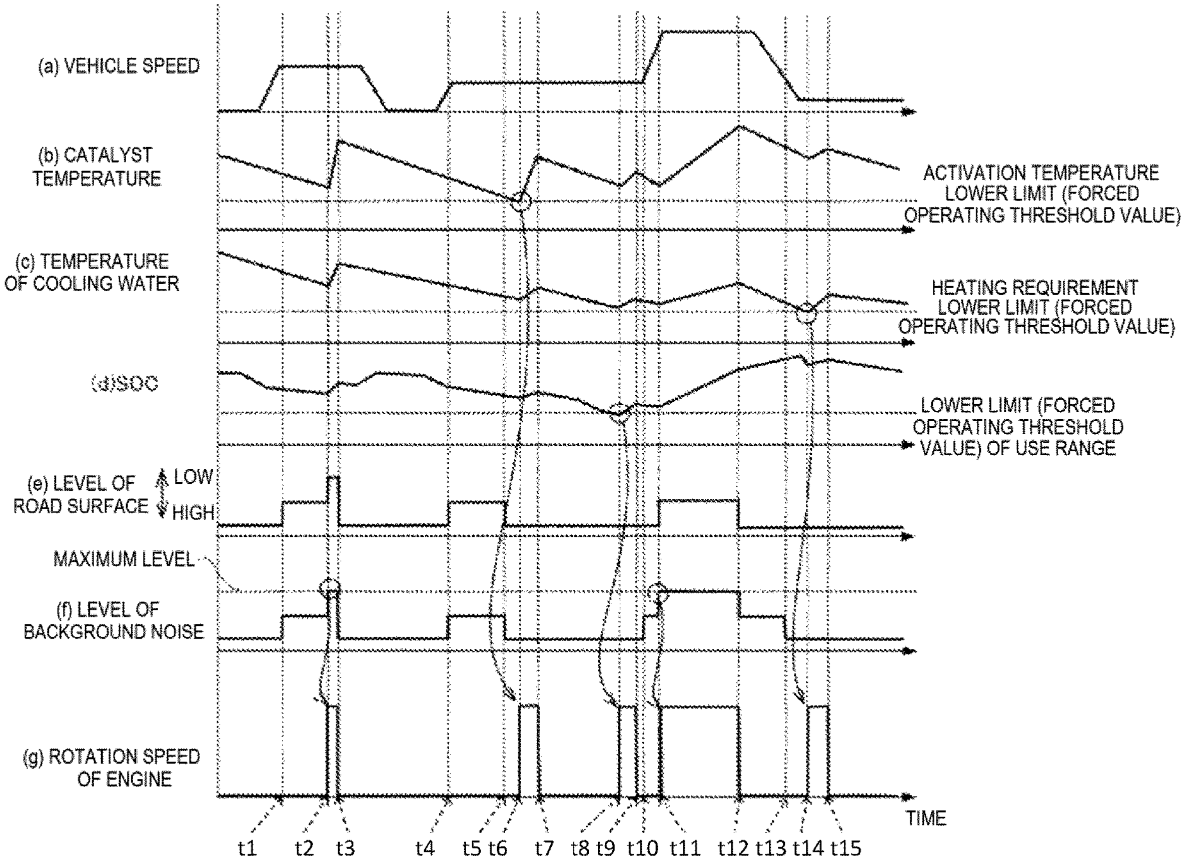
FIG. 3 is a timing chart illustrating a driving state of a vehicle according to a comparative example.

FIG. 3 is a timing chart illustrating a state of a hybrid vehicle according to a comparative example. In FIG. 3, (a) a vehicle speed, (b) the catalyst temperature, (c) the temperature of the cooling water, (d) the SOC, (e) a level of a traveling road surface, (f) the level of the background noise, and (g) a rotation speed of the engine 1 are shown from the top. In FIG. 3, (e) the level of the road surface and (f) the level of the background noise are illustrated in three levels.

In this example, when (f) the level of the background noise is a maximum level, the engine 1 is operated. Further, when three parameters including (b) the catalyst temperature, (c) the temperature of the cooling water, and (d) the SOC fall below the forced operating threshold value, the engine 1 is operated, and when these parameters become sufficiently large, the engine 1 is stopped. Further, (g) the operation control of the engine 1 is not performed according to (a) the vehicle speed.

Control from times t1 to t3 will be described. At the time t1, when (e) the level of the road surface becomes relatively low, (f) the level of the background noise increases. Then, at the time t2, when (e) the level of the road surface becomes further low, (f) the background noise reaches the maximum level, and (g) the operation of the engine 1 is started and the rotation speed increases. Thereafter, at the time t3, when (e) the level of the road surface becomes high, (f) the level of the background noise becomes low, (g) the engine 1 is stopped and the rotation speed is zero. Here, at the times t2 to t3, (g) the engine 1 is operated, and thus all of (b) the catalyst temperature, (c) the temperature of the cooling water, and (d) the SOC increase.

Next, control from times t4 to t5 will be described. At the time t4, when (e) the level of the road surface becomes low, (f) the background noise increases, but the level is not the maximum level. Further, at the time t5, when (e) the level of the road surface becomes high, (f) the level of the background noise becomes low. At the times t4 to t5, since (f) the background noise is not the maximum level, (g) the engine 1 is not operated.

Next, control from times t6 to t7 will be described. At the time t6, when (b) the catalyst temperature falls below the activation lower limit temperature (forced operating threshold value) of the catalyst, (g) the engine 1 is operated irrespective of (f) the background noise. Thereafter, at the time t7, when (b) the catalyst temperature becomes sufficiently high, (g) the engine 1 is stopped.

Next, control from times t8 to t9 will be described. At the time t8, when (d) the SOC falls below a lower limit value (forced operating threshold value) of a use range, (g) the engine 1 is operated irrespective of (f) the background noise. Thereafter, at the time t9, when (b) the SOC is sufficiently large, (g) the engine 1 is stopped.

Next, control from times t10 to t13 will be described. At the times t10 to t13, as compared to the operations at the times t1 to t3, (e) the level of the background noise becomes low in a first stage at the time t3, whereas (e) the level of the background noise becomes low in a second stage at the times t12 and t13. At the time t12, (e) the background noise is not at the maximum level, and thus (g) the engine 1 is stopped. As a result, at the times t11 to t12 at which (g) the engine 1 is operated, (b) the catalyst temperature, (c) the temperature of the cooling water, and (d) the SOC increase.

Next, control from times t14 to t15 will be described. At the time t14, when (c) the temperature of the cooling water falls below a forced operating threshold value of a heating requirement level range, (g) the engine 1 is operated. Thereafter, at the time t15, when (c) the temperature of the cooling water becomes sufficiently high, (g) the engine 1 is stopped.

As described above, operation periods of (g) the engine 1 include, in addition to a period of the times t2 to t3 and a period of the times t11 to t12 at which (f) the level of the background noise is at the maximum level, a period of the times t6 to t7 at which the operation of the engine 1 is started when (b) the catalyst temperature falls below the activation temperature lower limit (forced operating threshold value), a period of the times t8 to t9 at which the operation of the engine 1 is started when (d) the SOC falls below the lower limit (forced operating threshold value) of the use range, and a period of times t14 to t15 at which the operation of the engine 1 is started when (c) the temperature of the cooling water falls below a heating requirement lower limit (forced operating threshold value).

In such a comparative example, in addition to the case where (e) the level of the background noise is the maximum level, when (b) the catalyst temperature, (c) the temperature of the cooling water, and (d) the SOC fall below the forced operating threshold value, the engine 1 is operated irrespective of (d) the background noise, and the comfort in the vehicle interior may be impaired.

Next, an operation of the hybrid vehicle 100 according to the present embodiment will be described.

Figure 4:
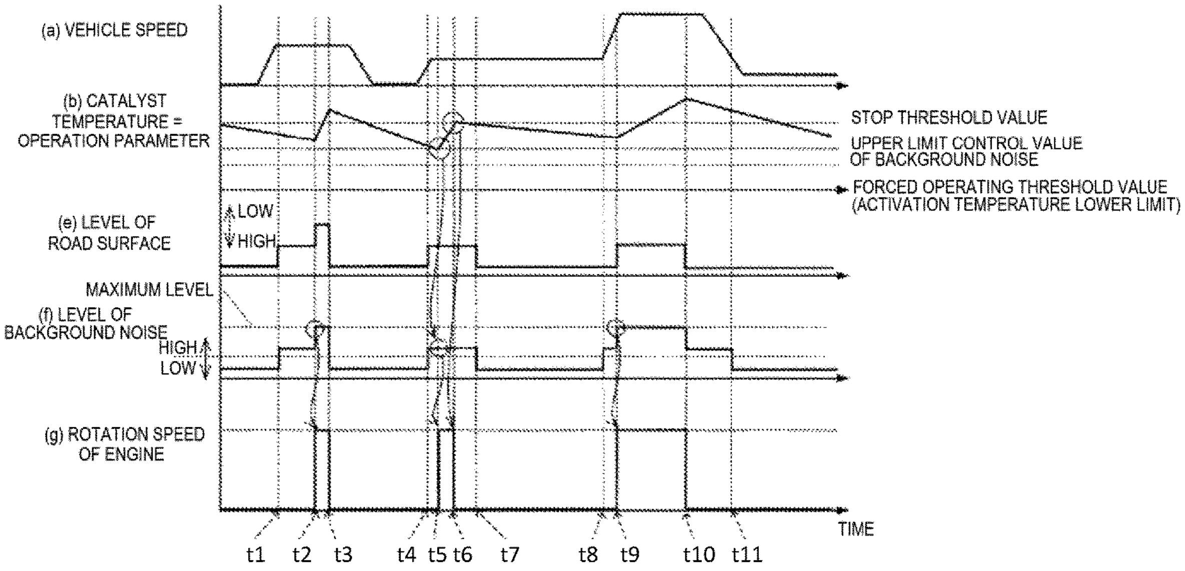
FIG. 4 is a timing chart illustrating a driving state of a vehicle according to the first embodiment.

FIG. 4 is a timing chart illustrating a state of the hybrid vehicle 100 according to the present embodiment. In FIG. 4, (a) the vehicle speed, (b) the catalyst temperature, (e) the level of the traveling road surface, (f) the level of the background noise, and (g) the rotation speed of the engine 1 are shown from the top. In addition, in FIG. 4, the description of (c) the temperature of the cooling water and (d) the SOC is omitted. In the present embodiment, similarly to the comparative example of FIG. 3, the engine 1 is operated even when (f) the level of the background noise is the maximum level. Further, (b) the catalyst temperature is used as the operation parameter, and the engine operation control illustrated in FIG. 2 is performed.

First, control from the times t1 to t3 will be described. At the times t1 to t3, the same process as the times t1 to t3 in the comparative example of FIG. 3 is performed, and the engine 1 is operated at the times t2 to t3 at which (f) the level of the background noise is maximum.

Next, control from the times t4 to t7 will be described. At the time t4, when (e) the level of the road surface becomes relatively low, (f) the level of the background noise increases. In this case, (f) the background noise is assumed to exceed the threshold value used for the level determination in the two stages in step S103 of FIG. 2.

Then, at the time t5, when the catalyst temperature falls below the upper limit control value of the background noise, the control of the engine 1 according to the level of the background noise is performed. At the time t5, the level of the background noise is high, and thus (g) the engine 1 is operated. Thereafter, at the time t6, when (b) the catalyst temperature reaches the stop threshold value, (g) the engine 1 is stopped.

Next, control from the times t8 to t11 will be described. At the times t8 to t11, the same process as the times t10 to t13 in the comparative example of FIG. 3 is performed. That is, at the times t9 to t10 at which (e) the level of the noise reaches the maximum level, (g) the engine 1 is operated, and (b) the catalyst temperature is increased.

In this way, in addition to the case where the background noise reaches the maximum level, the operation opportunity of the engine 1 can be reduced by using one operation parameter (catalyst temperature). Further, even in the state where the operation parameter does not fall below the forced operating threshold value, when the level of the background noise is relatively high (high level), the comfort in the vehicle interior is not impaired, and thus the engine 1 is operated. As a result, an opportunity for increasing the operation parameter is increased, and thus the operation of the engine 1 is restricted when the level of the background noise is low, and it is possible to improve the comfort in the vehicle interior.

According to the first embodiment, the following effects can be achieved.

According to a method for controlling the hybrid vehicle 100 of the first embodiment, the operation parameter whose value increases according to the operation time of the engine 1 is used. When the operation parameter falls below the forced operating threshold value (S101: No, S102: No, S110: Yes), the engine 1 is operated (S111).

Further, when the operation parameter is larger than the forced operating threshold value (S101: No, S102: Yes), the operation of the engine 1 is controlled according to the magnitude of the background noise. Specifically, when the magnitude of the background noise exceeds the threshold value and is at the high level (S104: Yes), the engine 1 is operated (S105).

By performing such control, even in the case where the operation parameter is larger than the forced operating threshold value, the engine 1 can be operated when the background noise is large, and thus in the state where the operation sound of the engine 1 is relatively difficult to be noticed by the driver, the operation parameter can be increased, and the state where the operation parameter exceeds the forced operating threshold value can be maintained. On the other hand, when the background noise is small, the operation sound of the engine 1 is easily noticed by the driver, and thus the operation of the engine 1 is restricted, whereby it is possible to improve the comfort in the vehicle interior.

Further, according to the method for controlling the hybrid vehicle 100 of the first embodiment, when the operation parameter becomes larger than the stop threshold value (S106: Yes), the engine 1 is stopped (S107). In this way, by restricting the operation time of the engine 1, the operation parameter can be controlled to be included in the appropriate numerical range.

According to the method for controlling the hybrid vehicle 100 of the first embodiment, in the case where the operation parameter is smaller than the upper limit control value of the background noise (or the stop threshold value) and is larger than the forced operating threshold value, when the magnitude of the background noise falls below the threshold value and is at the low level (S109: Yes), the engine 1 is stopped (S107). When the background noise is small, the operation sound of the engine 1 is easily noticed by the driver, and thus the operation of the engine 1 is restricted, whereby it is possible to improve the comfort in the vehicle interior.

According to the method for controlling the hybrid vehicle 100 of the first embodiment, the catalyst temperature in the exhaust system of the engine 1 acquired by the first temperature sensor 24 is used as the operation parameter. Regarding the catalyst, there is the activation lower limit temperature at which that the catalyst can operate in an activated state, and the catalyst temperature increases according to the operation time of the engine 1. Therefore, in principle, when the catalyst temperature falls below the activation lower limit temperature, the engine 1 is operated to increase the catalyst temperature. Further, in the present embodiment, even in the case where the catalyst temperature is equal to or larger than the activation lower limit temperature, the engine 1 can be operated when the background noise is large. Therefore, in the state where the operation sound of the engine 1 is relatively difficult to be noticed by the driver, the operation parameter can be increased, and as a result, overall, the state where the operation parameter exceeds the forced operating threshold value is easily maintained. On the other hand, when the background noise is small, the operation sound of the engine 1 is easily noticed by the driver, and thus the operation of the engine 1 is restricted, whereby it is possible to improve the comfort in the vehicle interior.

Second Embodiment

In the first embodiment, the control of determining the level of the background noise in two stages has been described, but the present invention is not limited thereto. In a second embodiment, control of determining the level of the background noise in three stages will be described.

Figure 5:
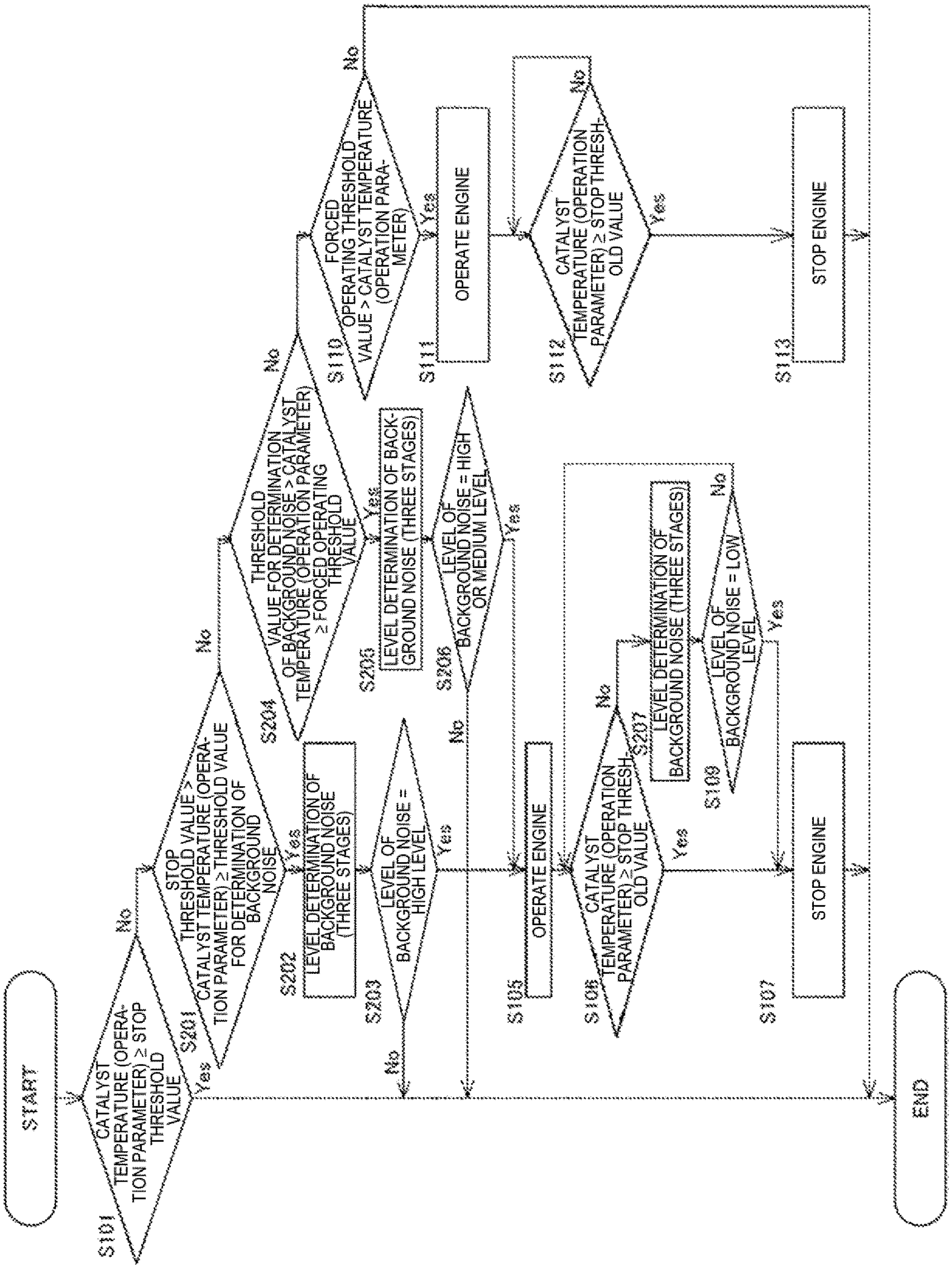
FIG. 5 is a flowchart illustrating engine operation control according to a second embodiment.

FIG. 5 is a flowchart of the engine operation control in the second embodiment. In the present embodiment, as compared with the engine operation control of the first embodiment illustrated in FIG. 2, processes of steps S201 to S206 and S207 are provided instead of the processes of steps S102 to S104 and S108.

First, the processes of steps S201 to S203 will be described.

In step S201, the engine controller 13 determines whether the catalyst temperature (operation parameter) is included in a numerical range of less than the stop threshold value and equal to or larger than the upper limit control value of the background noise. When it is determined that the catalyst temperature is included in the numerical range (S201: Yes), the engine controller 13 next performs the process of step S202 in order to determine whether the operation of the engine 1 according to the background noise is necessary.

On the other hand, when it is determined that the catalyst temperature is not included in the numerical range (S201: No), the engine controller 13 next performs the process of step S204 in order to determine whether the operation control of the engine 1 according to the background noise is necessary.

In step S202, the engine controller 13 obtains the background noise by using the angular velocity ω of the wheels 7 detected by the wheel speed sensor 23, and determines the magnitude of the background noise at three levels of high, medium, and low by using two threshold values.

In step S203, the engine controller 13 determines whether the background noise is at the high level. When the background noise is at the high level (S203: Yes), the engine controller 13 next performs the process of step S105 in order to operate the engine 1. On the other hand, when the background noise is not at the high level (S203: No), the engine controller 13 determines that it is not a situation for operating the engine 1, and ends the engine operation control. In this way, when the catalyst temperature is relatively high, the necessity to increase the catalyst temperature is relatively small, and thus the engine 1 is operated in a relatively short time during which the background noise reaches the high level.

Next, the processes of steps S204 to S206 will be described.

In step S204, the engine controller 13 determines whether the catalyst temperature is included in the numerical range of less than the upper limit control value of the background noise and equal to or larger than the forced operating threshold value. When it is determined that the catalyst temperature is included in the numerical range (S204: Yes), the engine controller 13 next performs the process of step S205 in order to determine whether the operation of the engine 1 according to the background noise is necessary.

On the other hand, when it is determined that the catalyst temperature is not included in the numerical range (S204: No), the engine controller 13 next performs the process of step S110 in order to perform a process according to the catalyst temperature.

In step S205, the same process as step S202 is performed. The engine controller 13 determines the magnitude of the background noise in the three stages.

In step S206, the engine controller 13 determines whether the background noise is at the high level or the medium level. When the background noise is at the high level or the medium level (S206: Yes), the engine controller 13 next performs the process of step S105 in order to operate the engine 1. On the other hand, when the background noise is not at the high level or the medium level but at the low level (S206: No), the engine controller 13 determines that it is not a situation for operating the engine 1, and ends the engine operation control. In this way, when the catalyst temperature is relatively low, the necessity to increase the catalyst temperature is relatively large, and thus the engine 1 is operated in a relatively long time during which the background noise reaches the high level or the medium level.

Of the two threshold values used for the determination of the background noise at the three levels in steps S202 and S205, the smaller one may be the same as the threshold value used for the level determination in the two stages in the first embodiment. When the smaller threshold value is the same as the threshold value used for the level determination in the two stages in the first embodiment, a condition on the level of the background noise for operating the engine 1 is the same as the condition of step S105 of the first embodiment.

Further, in step S207, similarly to steps S202 and S205, the engine controller 13 obtains the background noise by using the angular velocity J of the wheels 7 detected by the wheel speed sensor 23, and determines the magnitude of the background noise at the three levels. By determining the level of the background noise in this manner, the process according to the level of the background noise can be performed in subsequent Step S109.

The outline of the engine operation control illustrated in FIG. 5 is shown in the following table.

TABLE 2

| | Levels of background noise | | |
|---|---|---|---|
| | High | Medium | Low |
| Catalyst temperature (operation parameter) ≥ stop threshold value | Engine 1 is not operated | Engine 1 is not operated | Engine 1 is not operated |
| Stop threshold value > catalyst temperature (operation parameter) ≥ upper limit control value of background noise | Engine 1 is operated | Engine 1 is not operated | Engine 1 is not operated |
| Upper limit control value of background noise > catalyst temperature (operation parameter) ≥ forced operating threshold value | Engine 1 is operated | Engine 1 is operated | Engine 1 is not operated |
| Forced operating threshold value > catalyst temperature (operation parameter) | Engine 1 is operated | Engine 1 is operated | Engine 1 is operated |

In this table, the three levels of the background noise are illustrated in a column direction, and four conditions corresponding to the catalyst temperature are illustrated in a row direction. As compared with Table 1 of the first embodiment, the medium level of the background noise is added to a second column in the column direction. The case where the catalyst temperature is smaller than the stop threshold value and is equal to or larger than the upper limit control value of the background noise, which is illustrated in a second row in the row direction, corresponds to the process (S101: No, S201: Yes) illustrated in FIG. 5.

Referring to the second row, the catalyst temperature is larger than the upper limit control value of the background noise and has a relative allowance, and thus the engine 1 is operated in a relatively short time during which the background noise reaches the high level. As a result, it is possible to increase the catalyst temperature in the state where the operation sound of the engine 1 is relatively difficult to be noticed by the driver.

On the other hand, referring to a third row, in the case where the catalyst temperature is smaller than the upper limit control value of the background noise and has no relative allowance, the engine 1 is operated when the background noise is at the medium level or higher. In this case, the engine 1 is operated even when the level of the background noise is at the medium level, and thus the operation sound of the engine 1 is easily noticed by the driver, but the catalyst temperature can be more actively increased. Further, since the operation of the engine 1 is restricted when the background noise is at the low level, it is possible to improve the comfort in the vehicle interior.

According to the second embodiment, the following effects can be obtained.

According to the method for controlling the hybrid vehicle 100 of the second embodiment, in the case where the operation parameter (catalyst temperature) is smaller than the stop threshold value and is larger than the forced operating threshold value, when the operation parameter is relatively large and exceeds the upper limit control value of the background noise (S201: Yes), the threshold value of the background noise for operating the engine 1 is increased. As a result, when the level of the background noise is high (S203: Yes), the engine 1 is operated (S105). On the other hand, when the operation parameter is relatively small and falls below the upper limit control value of the background noise (S201: No, S204: Yes), the threshold value of the background noise for operating the engine 1 is decreased. As a result, when the level of the background noise is high or medium (S206: Yes), the engine 1 is operated (S105).

As described above, when the operation parameter is relatively large, the necessity to increase the operation parameter is low, and thus an operation condition according to the background noise is set to be relatively strict, and the engine 1 is operated when the background noise is at the high level. Therefore, in the state where the operation sound of the engine 1 is relatively difficult to be noticed by the driver, the state where the operation parameter exceeds the forced operating threshold value can be maintained.

On the other hand, when the operation parameter is relatively small, the necessity to increase the operation parameter is high, and thus the operation condition according to the background noise is relatively relaxed, and when the background noise is at the medium level or higher, the engine 1 is operated. Accordingly, although the operation sound of the engine 1 is easily noticed by the driver, the engine 1 is more actively operated, and thus the state where the operation parameter exceeds the forced operating threshold value can be maintained. At the same time, since the operation of the engine 1 is restricted when the background noise is at the low level, it is possible to improve the comfort in the vehicle interior.

Third Embodiment

In the first and second embodiments, it is determine whether the operation of the engine 1 is necessary according to the level of the background noise. In a third embodiment, control for changing output of the engine 1 according to the level of the background noise will be described.

Figure 6:
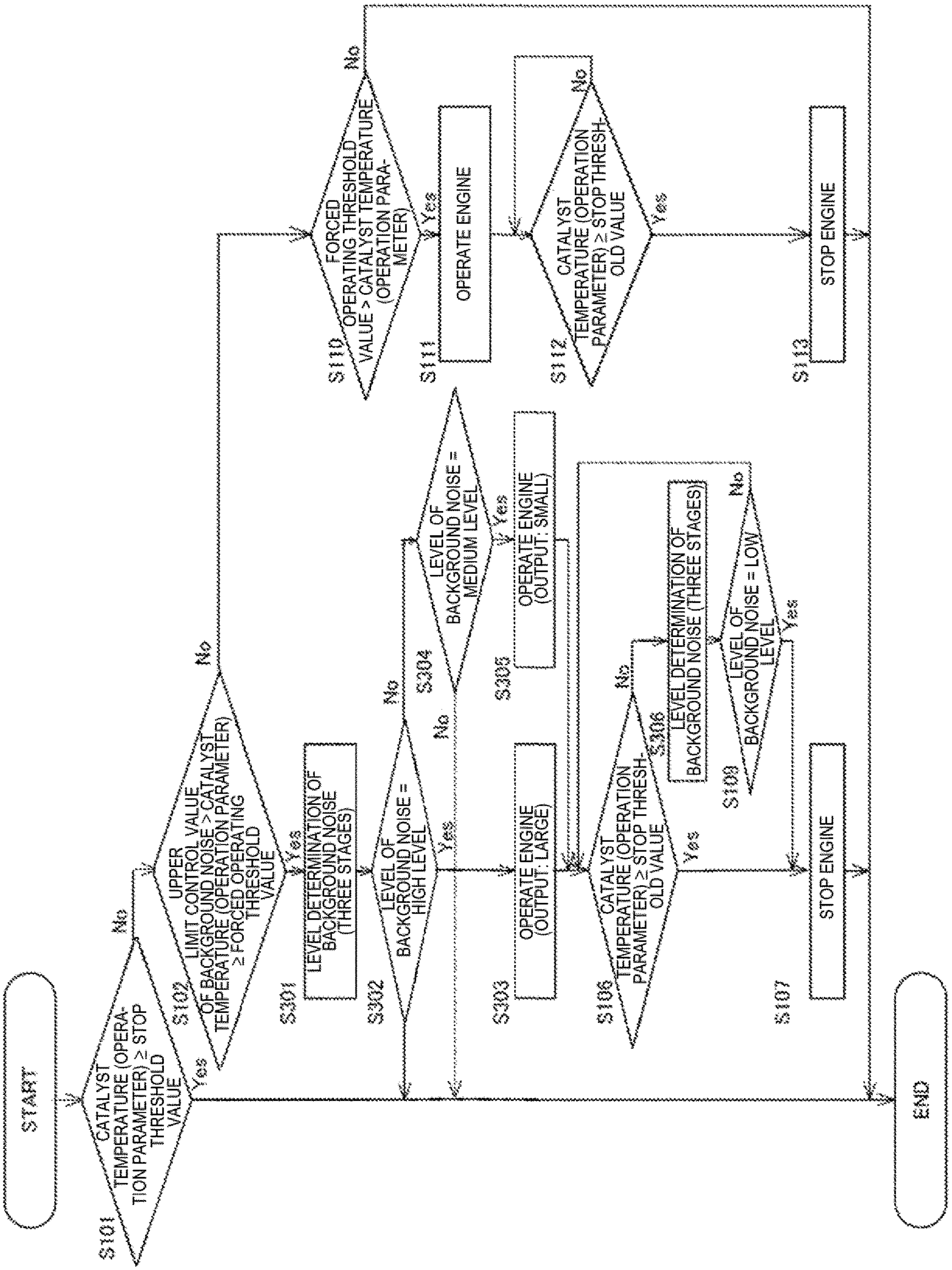
FIG. 6 is a flowchart illustrating engine operation control according to a third embodiment.

FIG. 6 is a flowchart of the engine operation control in the third embodiment. In the present embodiment, as compared with the engine operation control of the first embodiment illustrated in FIG. 2, processes of steps S301 to S305 and S306 are provided instead of the processes of steps S103 to S105 and S108.

In step S301, the engine controller 13 obtains the background noise by using the angular velocity ω of the wheels 7 detected by the wheel speed sensor 23, and determines the magnitude of the background noise at three levels of high, medium, and low. This determination process is the same as that in steps S202 and S205 of the second embodiment illustrated in FIG. 5.

In step S302, the engine controller 13 determines whether the background noise is at the high level. When the background noise is at the high level (S302: Yes), the engine controller 13 next performs a process of step S303 in order to operate the engine 1. On the other hand, when the background noise is not at the high level (S302: No), the engine controller 13 next performs a process of step S304 in order to further determine whether the operation of the engine 1 according to the background noise is necessary.

In step S303, the engine controller 13 operates the engine 1 with a relatively large output.

In step S304, the engine controller 13 determines whether the background noise is at the medium level. When the background noise is at the medium level (S304: Yes), the engine controller 13 next performs a process of step S305 in order to operate the engine 1. On the other hand, when the background noise is not at the medium level (S304: No), the engine controller 13 determines that it is not a situation for operating the engine 1, and ends the engine operation control.

In step S305, the engine controller 13 operates the engine 1 with a relatively small output.

In step S306, as in step S301, the engine controller 13 obtains the background noise by using the angular velocity ω of the wheels 7 detected by the wheel speed sensor 23, and determines the magnitude of the background noise at the three levels. By determining the level of the background noise in this manner, the process according to the level of the background noise can be performed in subsequent Step S109.

In this way, in the case where the catalyst temperature is smaller than the upper limit control value of the background noise and is equal to or larger than the forced operating threshold value (S101: No, S102: Yes), when the background noise is at the high level (S302: Yes), the engine 1 is operated with the large output (S303), and when the background noise is at the medium level (S304: Yes), the engine 1 is operated with the small output (S305). In this way, when the background noise is large, even if the engine 1 is operated with the large output and the operation sound increases, the operation sound is difficult to be noticed by the driver, and thus it is possible to increase the catalyst temperature while ensuring the comfort in the vehicle interior. On the other hand, when the background noise is at the medium level and is relatively small, the operation sound decreases by operating the engine 1 with the small output, and thus the operation sound is difficult to be noticed by the driver, and similarly, it is possible to increase the catalyst temperature while ensuring the comfort in the vehicle interior.

Of the two threshold values used for the determination of the background noise at the three levels in step S301, the smaller one may be the same as the threshold value used for the level determination in the two stages in the first embodiment. When the smaller threshold value is the same as the threshold value used for the level determination in the two stages in the first embodiment, the condition on the level of the background noise for operating the engine 1 is the same as the condition of step S105 of the first embodiment. Further, since the larger threshold value is used for the determination in step S302, the larger threshold value may be referred to as an output switching threshold value used for switching the output of the engine 1.

The outline of the engine operation control illustrated in FIG. 6 is shown in the following table.

TABLE 3

| | Levels of background noise | | |
|---|---|---|---|
| | High | Medium | Low |
| Catalyst temperature (operation parameter) ≥ stop threshold value | Engine 1 is not operated | Engine 1 is not operated | Engine 1 is not operated |
| Stop threshold value > catalyst temperature (operation parameter) ≥ upper limit control value of background noise | Engine 1 is not operated | Engine 1 is not operated | Engine 1 is not operated |
| Upper limit control value of background noise > catalyst temperature (operation parameter) ≥ forced operating threshold value | Engine 1 is operated (output: large) | Engine 1 is operated (output: small) | Engine 1 is not operated |
| Forced operating threshold value > catalyst temperature (operation parameter) | Engine 1 is operated | Engine 1 is operated | Engine 1 is operated |

In this table, similarly to the Table 2 in the second embodiment, the three levels of the background noise are shown in the column direction, and similarly to Table 1 illustrated in the first embodiment, the four conditions corresponding to the catalyst temperature (operation parameter) are shown in the row direction.

Referring to the third row, in the case where the catalyst temperature falls below the upper limit control value of the background noise and is equal to or larger than the stop threshold value, when the level of the background noise is high (S302: Yes), the engine 1 is operated with the large output (S303), and when the level of the background noise is medium (S304: Yes), the engine 1 is operated with the small output (S305).

In this way, when the background noise is large, even if the engine 1 is operated with the large output and the operation sound increases, the operation sound is difficult to be noticed by the driver. As a result, the operation parameter can be increased in a short period of time by increasing the operation parameter with the large output while maintaining the comfort in the vehicle interior. On the other hand, when the background noise is small, the operation sound decreases by operating the engine 1 with the small output, and is difficult to be noticed by the driver, and thus it is possible to increase the catalyst temperature while maintaining the comfort in the vehicle interior. As a result, the state where the operation parameter exceeds the forced operating threshold value is easily maintained.

According to the third embodiment, the following effects can be obtained.

According to the method for controlling the hybrid vehicle 100 of the third embodiment, in the case where the operation parameter is smaller than the upper limit control value of the background noise (or equal to the upper limit control value) and is larger than the forced operating threshold value (S101: No, S102: Yes), when the magnitude of the background noise exceeds the output switching threshold value which is relatively large, and is at the high level (S302: Yes), the engine 1 is operated with the large output (S303). On the other hand, when the magnitude of the background noise exceeds the output switching threshold value which is relatively small, and is at the medium level (S304: Yes), the engine 1 is operated with the small output (S305).

In this way, since the output of the engine 1 is changed to be increased as the background noise increases, it is possible to appropriately increase the operation parameter while ensuring the comfort in the vehicle interior. That is, when the background noise is large, the background noise is difficult to be noticed by the driver even the engine 1 is operated with the large output, and the catalyst temperature can be maintained equal to or higher than the lower limit temperature while maintaining the comfort in the vehicle interior. On the other hand, when the background noise is at the medium level, the operation sound of the engine 1 is easily noticed by the driver, and therefore, by reducing the output of the engine 1, it is possible to maintain the catalyst temperature equal to or higher than the lower limit temperature while maintaining the comfort in the vehicle interior.

Fourth Embodiment

In a fourth embodiment, another example of a stop condition of the engine 1 will be described.

Figure 7:
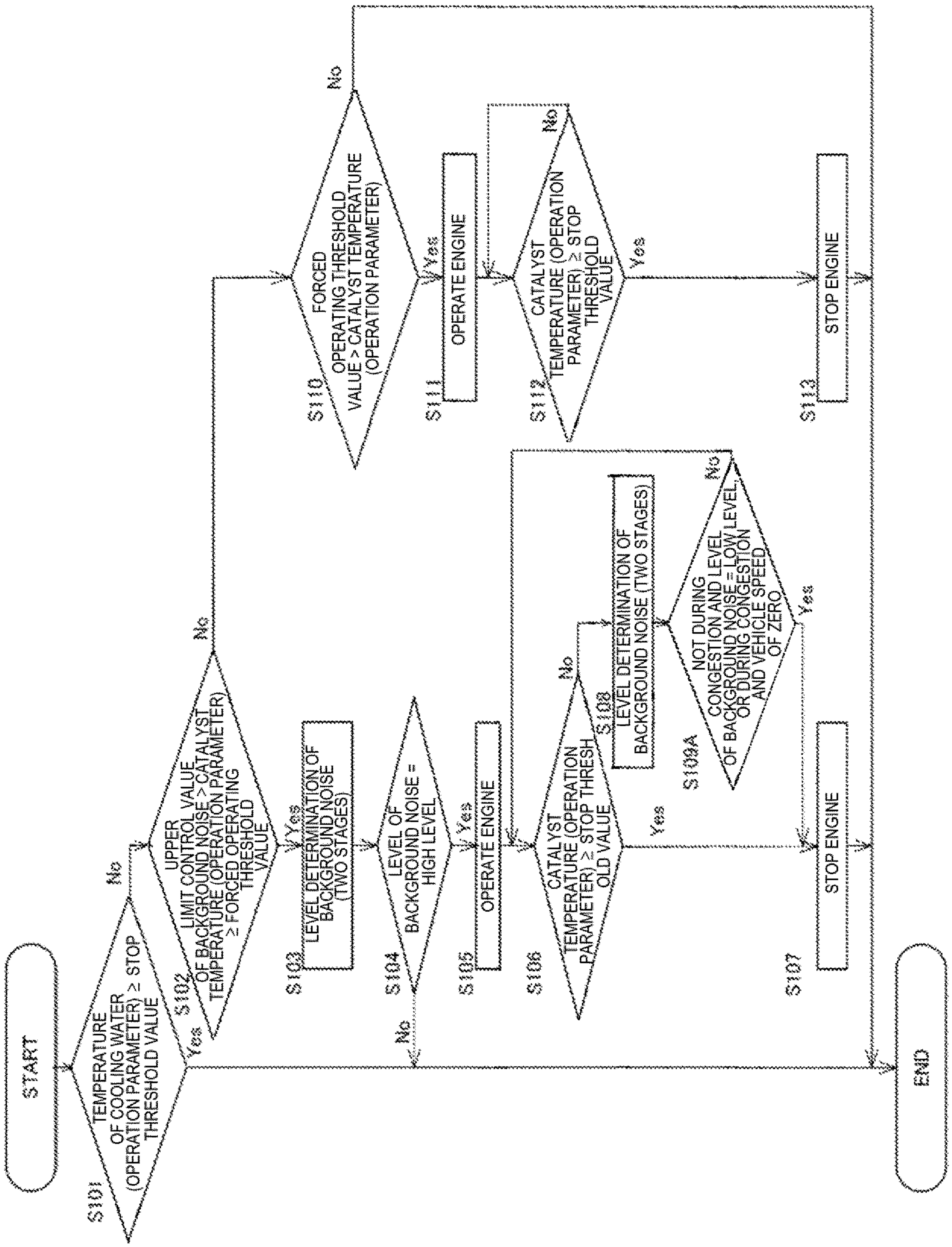
FIG. 7 is a flowchart illustrating engine operation control according to a fourth embodiment.

FIG. 7 is a flowchart illustrating the engine operation control according to the fourth embodiment. According to FIG. 7, as compared with the engine operation control of the first embodiment, a process of step S109A is provided instead of step S109.

In step S109A, a condition that the hybrid vehicle 100 is not traveling on a congestion route and the background noise is at the low level, or the hybrid vehicle 100 is traveling on the congestion route and the vehicle speed is zero (during stoppage) is added. That is, the engine is stopped according to the same determination process as that of the first to third embodiments except for the case of the congestion, and in the case of the congestion, the engine is stopped when the vehicle speed is zero.

Here, as illustrated in FIG. 2, in the process according to the first embodiment, during the congestion, the vehicle frequently travels at a low speed and the background noise is likely to reach the low level (S109: Yes), the engine 1 is likely to be stopped (S107), and thus it is difficult to obtain the operation timing of the engine 1. Therefore, during the congestion, the engine 1 is stopped (S107) when the vehicle speed is zero (during stoppage) (S109A: Yes), and the operation of the engine 1 is continued at the time of the low-speed traveling (S109A: No). As a result, the catalyst temperature is easily maintained equal to or higher than the activation lower limit temperature by operating the engine 1 at a few opportunities where the background noise occurs at the time of the low-speed traveling during the congestion.

In the present embodiment, it is further assumed that the upper limit control value of the noise used in step S102 is changed when an occurrence situation of the congestion or the like satisfies a predetermined condition.

Figure 8:
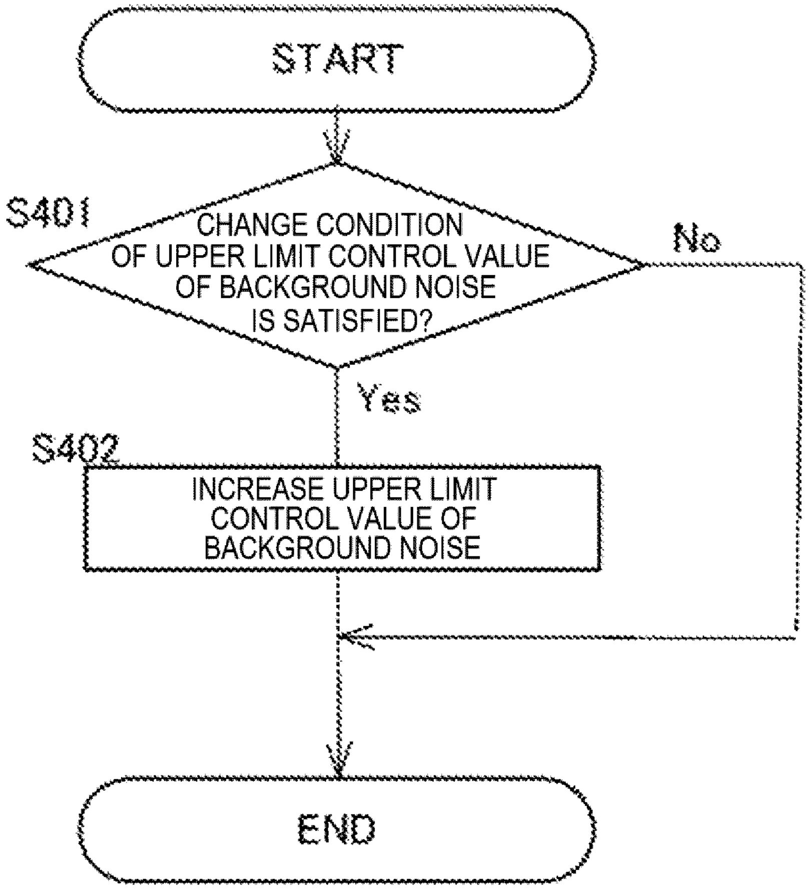
FIG. 8 is a flowchart illustrating change control of an upper limit control value of background noise.

FIG. 8 is a flowchart illustrating change control of the upper limit control value of the background noise. The change control of the upper limit control value of the background noise can be executed at any timing, and can be executed both before and after the engine operation control illustrated in FIG. 7.

In step S401, the motor controller 11 determines whether a change condition of the upper limit control value of the background noise is satisfied. When the change condition is satisfied (S401: Yes), the motor controller 11 next increases the upper limit control value of the background noise in a process of step S402. On the other hand, when the change condition is not satisfied (S401: No), the motor controller 11 ends the change control of the upper limit control value of the background noise.

As an example, a case where the congestion occurs on the route on which the vehicle 100 is traveling may be considered as the change condition. When the congestion occurs, there is less opportunity for the engine 1 to operate, and the catalyst temperature easily fall below the lower limit temperature. When the congestion occurs on the route on which the vehicle 100 is traveling, the upper limit control value of the background noise is increased.

As another example, an outside air temperature outside the vehicle 100 may be considered as the change condition in step S401. Specifically, when the outside air temperature falls below a predetermined threshold value, it is determined that the change condition is satisfied. The lower the outside air temperature, the catalyst temperature is easier to fall below the lower limit temperature by natural cooling. Therefore, by largely changing the upper limit control value of the background noise in advance, the engine 1 is operated more actively, and thus the catalyst temperature easily increases.

As still another example, the vehicle speed of the vehicle 100 may be considered as the change condition. When the vehicle speed exceeds a predetermined threshold value, it is determined that the change condition is satisfied. The higher the vehicle speed, the catalyst temperature is easier to fall below the lower limit temperature by natural cooling. Therefore, by largely changing the upper limit control value of the background noise in advance, the engine 1 is operated more actively, and thus the catalyst temperature easily increases.

Since the background noise is relatively small when the congestion occurs, it is difficult to obtain the operation opportunity of the engine 1. Therefore, since the engine 1 is more actively operated by increasing the upper limit control value of the background noise in advance, the catalyst temperature easily increases. Further, as described above, in the case where the background noise is at the low level, the engine 1 is stopped (S107) when the vehicle speed is zero and the vehicle is stopped (S109A: Yes), and on the other hand, the engine 1 is operated at the time of the low-speed traveling (S109A: No). As a result, it is possible to increase the catalyst temperature by operating the engine 1 at a few opportunities where the background noise occurs at the time of the low-speed traveling during the congestion.

In the change control illustrated in FIG. 8, the upper limit control value of the background noise is changed, but the present invention is not limited thereto. The stop threshold value may be changed together with the upper limit control value of the background noise. Since the engine 1 is difficult to be stopped even by increasing the stop threshold value, the operation parameter easily increases.

In the fourth embodiment, the following effects can be obtained.

According to the method for controlling the hybrid vehicle 100 of the fourth embodiment, the lower the temperature of the outside air with respect to the hybrid vehicle 100, the smaller the stop threshold value (or the upper limit control value of the background noise). The lower the outside air temperature, the catalyst temperature is easier to fall below the lower limit temperature by natural cooling. Therefore, by largely changing the upper limit control value of the background noise in advance, the engine 1 is operated more actively, and thus the catalyst temperature easily increases, and it is possible to maintain the catalyst temperature equal to or higher than the activation lower limit temperature.

According to the method for controlling the hybrid vehicle 100 of the fourth embodiment, in the case where it is determined that the hybrid vehicle 100 is traveling on a congested road, the engine 1 is operated when the hybrid vehicle 100 is not stopped and the vehicle speed is higher than zero.

At the time of the congestion, since the low-speed travelling is mainly executed, the background noise easily reaches the low level, and thus the operation opportunity of the engine 1 is reduced. Therefore, at the time of the congestion, when the background noise is at the low level, the engine 1 is stopped during stoppage (S109A: Yes) (S107), and the operation of the engine 1 is continued while the vehicle is traveling at the low speed (S109A: No). As a result, by using the opportunity where the background noise occurs at the time of the low-speed traveling during the congestion, it is possible to increase the catalyst temperature by operating the engine 1. As a result, the catalyst temperature is easily maintained equal to or higher than the activation lower limit temperature.

Fifth Embodiment

In a fifth embodiment, a case where the temperature of the cooling water in the engine 1 acquired by the second temperature sensor 25 is used as the operation parameter will be described. The temperature of the water in the engine 1 has a property that the longer the operation time of the engine 1, the higher the temperature. Further, there is an appropriate temperature zone for the temperature of the cooling water, and when the temperature falls below a lower limit value, a heating function of the vehicle interior is affected. Therefore, when the temperature of the cooling water falls below the lower limit value, the engine 1 is operated.

The engine operation control of the present embodiment is the same process as the engine operation control of the first to fourth embodiments, and the temperature of the cooling water is used as the operation parameter. Therefore, even in a case where the temperature of the cooling water is equal to or higher than a heating requirement lower limit temperature (forced operating threshold value), the engine 1 is operated when the background noise is at the high level, and thus in the state where the operation sound of the engine 1 is relatively difficult to be noticed by the driver, it is possible to maintain the temperature of the cooling water equal to or higher than the heating requirement lower limit temperature. On the other hand, when the background noise is at the low level, the operation sound of the engine 1 is easily noticed by the driver, and thus the operation of the engine 1 is restricted, whereby it is possible to improve the comfort in the vehicle interior.

In the present embodiment, similarly to the fourth embodiment, it is assumed that the change control of the upper limit control value of the background noise illustrated in FIG. 8 can be performed.

As the change condition of the upper limit control value of the background noise, the outside air temperature outside the hybrid vehicle 100 is used. Specifically, when the outside air temperature falls below the predetermined threshold value, it is determined that the change condition is satisfied. The temperature of the cooling water is easier to fall below the heating requirement lower limit temperature by natural cooling as the outside air temperature is lowered. Therefore, by largely changing the upper limit control value of the background noise in advance, the engine 1 is operated more actively, and thus the catalyst temperature easily increases.

As another example, a blower air volume introduced into a cooling system of the engine 1 may be considered as the change condition. When the blower air volume exceeds a predetermined threshold value, it is determined that the change condition is satisfied. The temperature of the cooling water is easier to fall below the lower limit temperature by natural cooling as the blower air volume increases. Therefore, by largely changing the upper limit control value of the background noise in advance, the engine 1 is operated more actively, and thus the temperature of the cooling water easily increases.

In the fifth embodiment, the following effects can be obtained.

According to the method for controlling the hybrid vehicle 100 of the fifth embodiment, the temperature of the cooling water in the engine 1 acquired by the second temperature sensor 25 is used as the operation parameter. Regarding the temperature of the cooling water, there is the heating requirement lower limit temperature (forced operating threshold value) for performing heating, and the temperature of the cooling water increases with the operation time of the engine 1. Therefore, even in a case where the temperature of the cooling water exceeds the heating requirement lower limit temperature, by operating the engine 1 when the background noise is large, it is possible to maintain the temperature of the cooling water equal to or higher than the heating requirement lower limit temperature while maintaining the comfort in the vehicle interior. On the other hand, when the background noise is small, the operation sound of the engine 1 is easily noticed by the driver, and thus the operation of the engine 1 is restricted, whereby it is possible to improve the comfort in the vehicle interior.

According to the method for controlling the hybrid vehicle 100 of the fifth embodiment, the lower the temperature of the outside air with respect to the hybrid vehicle 100, the larger the stop threshold value (or the upper limit control value of the background noise). The temperature of the cooling water is easier to fall below the stop threshold value by natural cooling as the outside air temperature is lowered. Therefore, by largely changing the upper limit control value of the background noise in advance, the engine 1 is operated more actively, and thus the temperature of the cooling water easily increases, and it is possible to maintain the temperature of the cooling water equal to or higher than the heating requirement lower limit temperature.

Sixth Embodiment

In a sixth embodiment, a case where the SOC of the battery 3 is used as the operation parameter will be described. The SOC has a property of increasing according to the operation time of the engine 1. Further, when the SOC falls below the lower limit value (forced operating threshold value) of the use range, the engine 1 is operated.

The engine operation control of the present embodiment is the same process as the engine operation control of the first to fourth embodiments, and the SOC is used as the operation parameter. Therefore, even in the case where the SOC is equal to or larger than the lower limit value of the use range, the engine 1 is operated when the background noise is at the high level, and thus in the state where the operation sound of the engine 1 is relatively difficult to be noticed by the driver, it is possible to increase the SOC. On the other hand, when the background noise is at the low level, the operation sound of the engine 1 is easily noticed by the driver, and thus the operation of the engine 1 is restricted, whereby it is possible to improve the comfort in the vehicle interior.

In the present embodiment, similarly to the fourth embodiment, it is assumed that the change control of the upper limit control value of the background noise illustrated in FIG. 8 can be performed.

As the change condition of the upper limit control value of the background noise in the present embodiment, for example, the vehicle speed, electric power consumption of an electric component, and a frequency of an acceleration operation by the driver are used. Since the SOC is easier to decrease as these parameters are larger, by largely changing the upper limit control value of the background noise in advance, the engine 1 is operated more actively, and thus the SOC easily increases.

In the sixth embodiment, the following effects can be obtained.

According to the method for controlling the hybrid vehicle 100 of the sixth embodiment, the SOC of the battery 3 is used as the operation parameter. Regarding the SOC, there is the lower limit value of the use range, and the SOC increases with the operation time of the engine 1. Therefore, even in the case where the SOC exceeds the lower limit value of the use range, by operating the engine 1 when the background noise is large, it is possible to increase the SOC while maintaining the comfort in the vehicle interior. On the other hand, when the background noise is small, the operation sound of the engine 1 is easily noticed by the driver, and thus the operation of the engine 1 is restricted, whereby it is possible to improve the comfort in the vehicle interior.

According to the method for controlling the hybrid vehicle 100 of the sixth embodiment, the higher the vehicle speed of the hybrid vehicle 100, the smaller the upper limit control value of the background noise (or the stop threshold value). In this way, the SOC is easier to fall below the lower limit value of the use range as the vehicle speed is higher and the electric power consumption increases. Therefore, by largely changing the upper limit control value of the background noise in advance, the engine 1 is operated more actively, and thus the SOC is easily maintained equal to or larger than the lower limit value of the use range. Similarly, the SOC is easier to decrease as the electric power consumption of the electric component increases and the frequency of the acceleration operation by the driver increases, and thus the upper limit control value of the background noise may be largely changed in advance.

Seventh Embodiment

In a seventh embodiment, the negative pressure in the vacuum servo of the friction brake 8 acquired by the pressure sensor 26 may be used as the operation parameter. The negative pressure has a property of increasing according to the operation time of the engine 1. In addition, the negative pressure has an appropriate numerical range, and when the negative pressure falls below a lower limit value (forced operating threshold value), obtaining an assisting function performed by the vacuum servo is difficult when the brake pedal is depressed. Therefore, when the negative pressure falls below the lower limit value, the engine 1 is operated to increase the negative pressure.

The engine operation control of the present embodiment is the same process as the engine operation control of the first to fourth embodiments, and the negative pressure described above is used as the operation parameter. Therefore, even in a case where the negative pressure is equal to or larger than the lower limit value, the engine 1 is operated when the background noise is at the high level, and thus in the state where the operation sound of the engine 1 is relatively difficult to be noticed by the driver, it is possible to increase the negative pressure. On the other hand, when the background noise is at the low level, the operation sound of the engine 1 is easily noticed by the driver, and thus the operation of the engine 1 is restricted, whereby it is possible to improve the comfort in the vehicle interior.

Further, similarly to the fourth embodiment, it is assumed that the change control of the upper limit control value of the background noise illustrated in FIG. 8 can be performed.

As the change condition of the upper limit control value of the background noise, for example, a depression frequency of the brake pedal by the driver is used. Since the negative pressure of the vacuum servo is easier to decrease as the depression frequency increases, by largely changing the upper limit control value of the background noise in advance, the engine 1 is operated more actively, and thus the negative pressure easily increases.

In addition, a case where congestion occurs on a predicted route of the hybrid vehicle 100 may be considered as the change condition. When the congestion occurs, the depression frequency of the brake pedal by the driver easily increase. Therefore, by largely changing the upper limit control value of the background noise in advance, the engine 1 is operated more actively, and thus the negative pressure easily increases.

In the seventh embodiment, the following effects can be obtained.

According to the method for controlling the hybrid vehicle 100 of the seventh embodiment, the negative pressure in the vacuum servo of the friction brake 8 is used as the operation parameter. Regarding the negative pressure, there is the lower limit value (forced operating threshold value), and the negative pressure increases according to the operation time of the engine 1. Therefore, even when the negative pressure exceeds the lower limit value, by operating the engine 1 when the background noise is large, it is possible to increase the negative pressure while maintaining the comfort in the vehicle interior. On the other hand, when the background noise is small, the operation sound of the engine 1 is easily noticed by the driver, and thus the operation of the engine 1 is restricted, whereby it is possible to improve the comfort in the vehicle interior.

According to the method for controlling the hybrid vehicle 100 of the seventh embodiment, the higher the operation frequency of the brake pedal, the smaller the upper limit control value of the background noise (or the stop threshold value). The higher the operation frequency of the brake pedal, the negative pressure is easier to decrease. Therefore, by largely changing the upper limit control value of the background noise in advance, the engine 1 is operated more actively, and thus the negative pressure is easily maintained equal to or larger than the use lower limit value.

Eighth Embodiment

In the first to seventh embodiments, the example in which one operation parameter is used has been described, but the present invention is not limited thereto. In the present embodiment, an example in which a plurality of operation parameters are used will be described.

In the present embodiment, it is assumed that the engine operation control is performed by using two operation parameters, that is, the catalyst temperature acquired by the first temperature sensor 24 and the temperature of the cooling water acquired by the second temperature sensor 25. The details of the engine operation control are illustrated in the following table.

TABLE 4

| | Catalyst temperature ≥ stop threshold value | Stop threshold value > catalyst temperature ≥ forced operating threshold value | Forced operating threshold value > catalyst temperature |
|---|---|---|---|
| Temperature of cooling water ≥ stop threshold value | Engine 1 is not operated | Engine 1 is not operated | Engine 1 is not operated |
| Stop threshold value > temperature of cooling water ≥ forced operating threshold value | Engine 1 is not operated | Background noise (large): operated Background noise (small): not operated | Engine 1 is operated |
| Forced operating threshold value > temperature of cooling water | Engine 1 is operated | Engine 1 is operated | Engine 1 is operated |

In this table, the conditions of the catalyst temperature are illustrated in the column direction, and the conditions of the temperature of the cooling water are illustrated in the row direction. In this table, regarding the temperature of the cooling water and the catalyst temperature, for readability, the cases where each of the temperature of the cooling water and the catalyst temperature is smaller than the stop threshold value and is equal to or larger than the upper limit control value of the background noise, and the cases where each of the temperature of the cooling water and the catalyst temperature is smaller than the upper limit control value of the background noise and is equal to or larger than the forced operating threshold value, are illustrated as the cases where each of the temperature of the cooling water and the catalyst temperature is smaller than the stop threshold value and is equal to or larger than the forced operating threshold value.

As illustrated in the first row, when the temperature of the cooling water exceeds the stop threshold value, the engine 1 is not operated. Similarly, as illustrated in a left column, when the catalyst temperature exceeds the stop threshold value, the engine 1 is not operated.

On the other hand, as illustrated in a central cell (the second row and the second column), when the catalyst temperature falls below the stop threshold value and is equal to or larger than the forced operating threshold value, and the temperature of the cooling water falls below the stop threshold value and is equal to or larger than the forced operating threshold value, the presence or absence of the operation of the engine 1 is determined according to the level of the background noise. Specific processes on the presence or absence of the operation according to the level of the background noise is the same as the processes of Steps S103 to S109 in FIG. 2.

In the states (the second row and the third column, the third row and the second column, and the third row and the third column) other than the above state, the engine 1 is operated. In this way, even in the case where the plurality of parameters are used, it is possible to control the presence or absence of the operation of the engine 1 according to the level of the background noise. Therefore, the engine 1 is operated when the background noise is at the high level, and thus in the state where the operation sound of the engine 1 is relatively difficult to be noticed by the driver, it is possible to increase the operation parameters. On the other hand, when the background noise is at the low level, the operation sound of the engine 1 is easily noticed by the driver, and thus the operation of the engine 1 is restricted, whereby it is possible to improve the comfort in the vehicle interior.

According to an eighth embodiment, the following effects can be obtained.

According to the method for controlling the hybrid vehicle of the eighth embodiment, the plurality of operation parameters are used. Even in the case where the plurality of operation parameters are used, when both of the operation parameters are between the stop threshold value and the forced operating threshold value, the operation control of the engine 1 according to the background noise is performed. In this way, the engine 1 can be operated when the background noise is at the high level, and thus in the state where the operation sound of the engine 1 is relatively difficult to be noticed by the driver, it is possible to increase the operation parameters by the operation of the engine 1. On the other hand, when the background noise is small, the operation sound of the engine 1 is easily noticed by the driver, and thus the operation of the engine 1 is restricted, whereby it is possible to improve the comfort in the vehicle interior.

Although the embodiments of the present invention are described above, the above embodiments are merely a part of application examples of the present invention, and do not mean that the technical scope of the present invention is limited to the specific configurations of the above embodiments. Each of the embodiments described above has been described as a single embodiment, but may be appropriately combined.

The invention claimed is:

1. A method for controlling a hybrid vehicle comprising a motor serving as a driving source, a battery configured to supply electric power to the motor, and an engine capable of supplying electric power to the battery by driving a generator, the method comprising:

determining a parameter which is at least one of a temperature of a catalyst provided in an exhaust path of the engine, a temperature of cooling water in the engine, or a negative pressure of a vacuum servo provided in a brake of the hybrid vehicle;

acquiring a background noise magnitude;

operating the engine responsive to the background noise magnitude exceeding a noise threshold value and the parameter being less than an upper limit control value;

after operating the engine responsive to the background noise magnitude exceeding the noise threshold value and the parameter being less than the upper limit control value, stopping the engine responsive to the background noise magnitude being less than or equal to the noise threshold value;

operating the engine responsive to the parameter falling below a forced operating threshold value irrespective of the background noise magnitude, the forced operating threshold value being less than the upper limit control value; and after operating the engine responsive to the parameter falling below the forced operating threshold value irrespective of the background noise magnitude, stopping the engine responsive to the parameter being equal to or greater than a stop threshold value, the stop threshold value being greater than the upper limit control value.

2. The method for controlling the hybrid vehicle according to claim 1, wherein:

after the engine is operated in response to the background noise magnitude exceeding the noise threshold value and the parameter being less than the upper limit control value, in a case where it is determined that the hybrid vehicle travels on a congested road, the engine is stopped when the background noise magnitude falls below the noise threshold value and a vehicle speed of the hybrid vehicle is zero.

3. The method for controlling the hybrid vehicle according to claim 1, wherein:

the noise threshold value increases as the parameter increases.

4. The method for controlling the hybrid vehicle according to claim 1, wherein:

when the engine is operated in response to the background noise magnitude exceeding the noise threshold value, and the parameter being greater than the forced operating threshold value and less than the stop threshold value, operating the engine, an output of the engine increases as the background noise magnitude increases.

5. The method for controlling the hybrid vehicle according to claim 1, wherein:

the parameter is the temperature of the catalyst provided in the exhaust path of the engine or the temperature of the cooling water in the engine, and the stop threshold value increases as a temperature of outside air with respect to the hybrid vehicle decreases.

6. The method for controlling the hybrid vehicle according to claim 1, wherein:

the parameter is the negative pressure of the vacuum servo provided in the brake of the hybrid vehicle, and the stop threshold value increases as an operation frequency of the brake increases.

7. A hybrid vehicle comprising:

a motor serving as a drive source;

a battery configured to supply electric power to the motor;

an engine capable of supplying electric power to the battery by driving a generator; and a controller configured to:

determine a parameter which is at least one of a temperature of a catalyst provided in an exhaust path of the engine, a temperature of cooling water in the engine, or a negative pressure of a vacuum servo provided in a brake of the hybrid vehicle, acquire a background noise magnitude, responsive to the background noise magnitude exceeding a noise threshold value and the parameter being value and less than an upper limit control value, operate the engine, (i) after operating the engine responsive to the background noise magnitude exceeding the noise threshold value and the parameter being less than the upper limit control value and (ii) responsive to the background noise magnitude being less than or equal to the noise threshold value, stop the engine, responsive to the parameter falling below a forced operating threshold value irrespective of the background noise magnitude, operate the engine, the forced operating threshold value being less than the upper limit control value, and (i) after operating the engine responsive to the parameter falling below the forced operating threshold value irrespective of the background noise magnitude and (ii) responsive to the parameter being equal to or greater than a stop threshold value, stop the engine, the stop threshold value greater than the upper limit control value.

8. The method for controlling the hybrid vehicle according to claim 1, further comprising:

setting an upper limit control value of background noise that is greater than the forced operating threshold value and less than the stop threshold value; and responsive to the parameter being equal to or greater than the upper limit control value of background noise and less than the stop threshold value, stopping the engine even if the background noise magnitude exceeds the noise threshold value.

9. The hybrid vehicle according to claim 7, wherein the controller is further configured to:

set an upper limit control value of background noise that is greater than the forced operating threshold value and less than the stop threshold value; and responsive to the parameter being equal to or greater than the upper limit control value of background noise and less than the stop threshold value, stopping the engine even if the background noise magnitude exceeds the noise threshold value.

10. The hybrid vehicle according to claim 7, wherein the noise threshold value increases as the parameter increases.

11. The hybrid vehicle according to claim 7, wherein:

when the engine is operated in response to the background noise magnitude exceeding the noise threshold value and the parameter being greater than the upper limit control value, the controller is further configured to increase an output of the engine as the background noise magnitude increases.

12. The hybrid vehicle according to claim 7, wherein:

the parameter is the temperature of the catalyst provided in the exhaust path of the engine or the temperature of the cooling water in the engine; and the controller is further configured to increase the stop threshold value as a temperature of outside air with respect to the hybrid vehicle decreases.

13. The hybrid vehicle according to claim 7, wherein:

the parameter is the negative pressure of the vacuum servo provided in the brake of the hybrid vehicle; and the controller is further configured to increase the stop threshold value as an operation frequency of the brake increases.

* * * * *